(12) United States Patent
Froehner et al.

(10) Patent No.: US 10,397,310 B2
(45) Date of Patent: Aug. 27, 2019

(54) METHOD, CONFIGURATION, USE OF THE METHOD AND COMPUTER PROGRAM PRODUCT FOR EVALUATING ENERGY ENGINEERING DATA

(71) Applicant: SIEMENS AKTIENGESELLSCHAFT, Munich (DE)

(72) Inventors: Wiebke Froehner, Amberg (DE); Thomas Werner, Rednitzhembach (DE)

(73) Assignee: Siemens Aktiengesellschaft, Munich (DE)

( * ) Notice: Subject to any disclaimer, the term of this patent is extended or adjusted under 35 U.S.C. 154(b) by 668 days.

(21) Appl. No.: 14/823,116

(22) Filed: Aug. 11, 2015

(65) Prior Publication Data
US 2016/0044094 A1 Feb. 11, 2016

(30) Foreign Application Priority Data
Aug. 11, 2014 (EP) ..................................... 14180535

(51) Int. Cl.
*H04L 29/08* (2006.01)
*G06Q 50/06* (2012.01)
*G06Q 10/06* (2012.01)

(52) U.S. Cl.
CPC ......... *H04L 67/10* (2013.01); *G06Q 10/0637* (2013.01); *G06Q 50/06* (2013.01)

(58) Field of Classification Search
CPC ..... H04L 67/10; G06Q 10/0637; G06Q 50/06
See application file for complete search history.

(56) References Cited

U.S. PATENT DOCUMENTS

| | | | |
|---|---|---|---|
| 7,136,358 B2* | 11/2006 | Kunito | H04L 67/2823 370/238 |
| 8,965,719 B1* | 2/2015 | Ippolito | G06F 3/05 702/179 |
| 9,173,011 B2* | 10/2015 | Robinson | G01D 4/002 |
| 9,218,068 B2* | 12/2015 | Zhang | G06F 3/038 |
| 9,285,851 B2* | 3/2016 | Hodges | H01M 10/4257 |
| 2003/0014209 A1* | 1/2003 | Arnaout | G06F 11/2294 702/122 |

(Continued)

*Primary Examiner* — Uzma Alam
(74) *Attorney, Agent, or Firm* — Laurence Greenberg; Werner Stemer; Ralph Locher

(57) ABSTRACT

A method evaluates power engineering data using a data request that is transmitted to a coupling device by a first communication link. The coupling device is used to convert the data request from a coupling data format into a further data request that is specific to an energy engineering device in a device-specific data format. The further data request is transmitted to the power engineering device by a second communication link. The power engineering device transmits its power engineering data, requested by the further data request, to the coupling device by the second communication link. The power engineering data are in a data format that is specific to the power engineering device, and the coupling device converts all the power engineering data requested by further data requests into a data response in the coupling data format and uses the first communication link to transmit them to the evaluation device.

13 Claims, 1 Drawing Sheet

(56) References Cited

U.S. PATENT DOCUMENTS

| | | | | |
|---|---|---|---|---|
| 2003/0078677 A1* | 4/2003 | Hull | .................. | G05B 15/02 |
| | | | | 700/1 |
| 2006/0028354 A1* | 2/2006 | Green | .................. | G01D 4/004 |
| | | | | 340/870.02 |
| 2007/0047279 A1* | 3/2007 | Evans | .................. | G06F 9/541 |
| | | | | 365/1 |
| 2010/0131076 A1* | 5/2010 | Colombo | .................. | G06F 8/00 |
| | | | | 700/7 |
| 2010/0145629 A1* | 6/2010 | Botich | .................. | G06Q 10/00 |
| | | | | 702/23 |
| 2010/0332569 A1* | 12/2010 | Bryant-Rich | .......... | H04N 5/775 |
| | | | | 707/770 |
| 2012/0078547 A1* | 3/2012 | Murdoch | .............. | G01D 4/004 |
| | | | | 702/62 |
| 2012/0232816 A1* | 9/2012 | Oh | .................. | G01D 4/004 |
| | | | | 702/62 |
| 2013/0268343 A1 | 10/2013 | Ur | | |
| 2013/0304273 A1* | 11/2013 | Willig | .................. | H02J 3/14 |
| | | | | 700/296 |
| 2013/0311793 A1* | 11/2013 | Chang | .................. | G06F 1/206 |
| | | | | 713/300 |
| 2014/0025977 A1* | 1/2014 | Mukherjee | ........ | H04W 52/0216 |
| | | | | 713/323 |
| 2014/0122051 A1* | 5/2014 | Tobe | .................. | G06F 17/5009 |
| | | | | 703/18 |
| 2014/0133585 A1* | 5/2014 | Shen | .................. | H04B 3/542 |
| | | | | 375/257 |
| 2014/0177738 A1* | 6/2014 | Alshinnawi | .............. | H04B 3/54 |
| | | | | 375/257 |
| 2014/0358311 A1* | 12/2014 | Lai | .................. | G01D 4/002 |
| | | | | 700/295 |
| 2015/0365904 A1* | 12/2015 | Luna | ................ | H04W 52/0258 |
| | | | | 455/574 |

\* cited by examiner

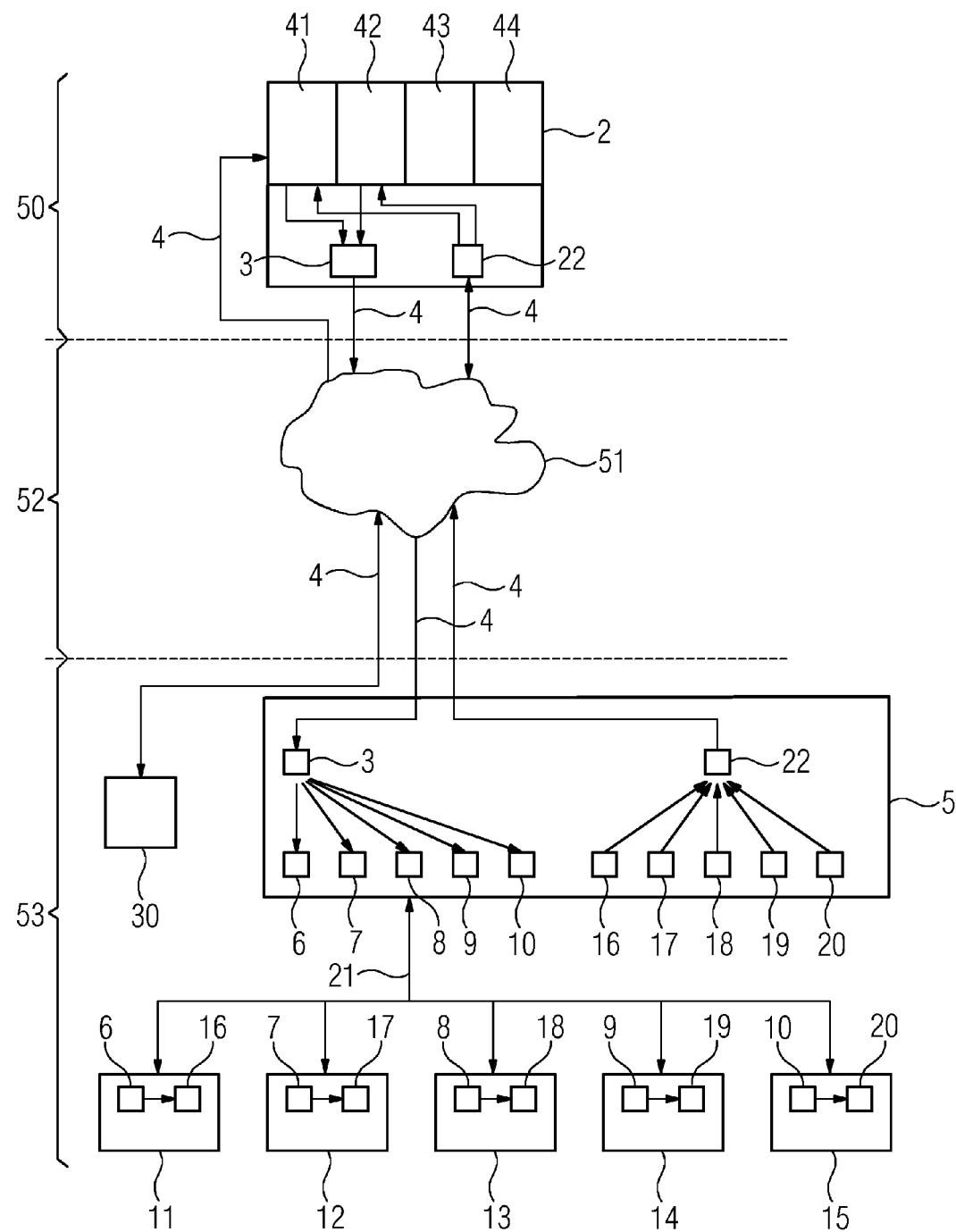

METHOD, CONFIGURATION, USE OF THE METHOD AND COMPUTER PROGRAM PRODUCT FOR EVALUATING ENERGY ENGINEERING DATA

CROSS-REFERENCE TO RELATED APPLICATION

This application claims the priority, under 35 U.S.C. § 119, of German application EP 14 180 535.8, filed Aug. 11, 2014; the prior application is herewith incorporated by reference in its entirety.

BACKGROUND OF THE INVENTION

Field of the Invention

The invention relates to a method for evaluating power engineering data.

The deregulation of the energy markets and the energy transition present energy supply companies with great problems. The constantly changing energy-management and regulatory constraints and the increasing decentralization of energy generation require energy engineering automation to be adjusted or expanded. Since the yield situation in terms of company profit by the respective energy supply companies is also becoming worse at the same time, companies are forced to reduce both investment costs and operating costs for their energy automation.

The volatile market environment of the energy supply companies forces them to take ever faster adjustment measures for their energy engineering automation. Since the energy distribution grids need to be regulated even more dynamically in the future by virtue of the supply of the local generation and the active consumption behavior of the electricity consumers, the energy supply companies are forced to take on the new challenges flexibly. This increasingly results in the avoidance of relatively great investment; this is because smaller energy suppliers, in particular, avoid setting up further infrastructure owing to a comparatively high risk of false investment. Since the technical and regulatory requirements for energy supply grids with regard to "smart grid" applications change constantly, this tendency for the energy supply companies to avoid investment is intensified further.

Besides the investment issue (investment expenses, also called "capital expenditure"), operative processes must necessarily be optimized (expenses for business operations, also called "operational expenditure"). The complex energy engineering automation solutions currently in use require a high level of outlay for safe and reliable operation and need to be monitored by experienced and competent personnel. The cited high cost pressure means that the energy supply companies are at increasing pains to reduce this strong commitment of resources in terms of equipment and personnel.

In the course of these constraints, the behavior of the energy supply companies also changes. They are ever more prepared to standardize even essential technical and economic functions and processes and to transfer them to service providers if this results in economic advantages. Added to this is the altered appointment of younger personnel who have grown up with computers, software applications and online services. The current web-based services already available on the market therefore meet with a high level of acceptance among the customers.

The website "www.c3energy.com/technology" reveals a method for evaluating energy engineering data that involves various customer systems with a customer, such as intelligent electricity meters, building automation equipment and computer systems, each providing different data. The different data are combined by a data integrator and transmitted to an evaluation device at the company c3energy. There, the data are analyzed by use of the evaluation device and presented to the customer as "software as a service" in the form of a web-based interface.

SUMMARY OF THE INVENTION

The invention has the object of providing a method for evaluating energy engineering data that can be used particularly easily to alter the evaluation of the energy engineering data by an evaluation arrangement in the course of operation of the method.

The invention achieves this object by a method for evaluating power engineering data, in which an evaluation arrangement is used to produce a data request in a coupling data format. The data request is transmitted to a coupling device by a first communication link. The coupling device is used to convert the data request from the coupling data format into at least one data request that is specific to an energy engineering device in a device-specific data format. The at least one specific data request is transmitted to the respective power engineering device by a respective second communication link. The respective power engineering device transmits its power engineering data, requested by the respective specific data request, to the coupling device by the respective second communication link. The power engineering data are in a data format that is specific to the power engineering device, and the coupling device converts all the power engineering data requested by specific data requests into a data response in the coupling data format and uses the first communication link to transmit them to the evaluation device.

In this instance, it is clear to a person skilled in the art that, although the invention is particularly suited for use in the field of energy engineering, it can also advantageously be used in other fields of engineering. These may be other infrastructures (traffic, water management) or even heterogeneous automation solutions, for example, as can be found in complex industrial processes (e.g. in the chemical industry or in mining).

Within the context of the invention, the evaluation arrangement is in this case intended to be understood to mean a computer or a cloud-based data processing arrangement, for example, that uses a web server to provide various evaluation methods for energy engineering data. In this case, the evaluation methods can also be provided for customers as what is known as "software as a service" via the web server, and in this way the customers do not have to keep their own evaluation methods for their energy engineering data. In this case, the evaluation device caters for the data interchange with the coupling device, the evaluation or computation of the results and the presentation thereof for the user in the form of reports, tables and graphics, for example.

A coupling data format is in this case intended to be understood to mean a standard data format that is embodied as a type of metadata model regardless of the specific implementation of the downstream energy automation.

A data request combines all the data requests that are necessary for evaluation in the evaluation arrangement, for example.

A coupling device within the context of the invention is intended to be understood to mean an intelligent adapter that, having once been set up, e.g. at an energy supply company, allows the data requests from the evaluation device to be understood, for example even if they change, and data to be provided that are available at the energy supply company or in the energy engineering devices thereof in the example. In this case, each energy supply company has installed a coupling device of its own. The coupling device may be embodied as a specific appliance or be implemented as a data processing method on a computer or a cloud-based data processing arrangement, such as a company cloud. The coupling device translates the requests for data, which requests are formulated on the basis of the metadata model, into the data formats used by each of the connected energy engineering devices; in this case, it also assigns the requests to the corresponding energy engineering devices. If the data request contains a request for electricity meter measurement data, for example, then the coupling device assigns this portion of the data request to connected electricity meters and produces a corresponding specific data request to the electricity meters.

To this end, translation tables can be used in the coupling module that are able to be generated from known manufacturer details from the energy engineering devices automatically or to be input manually.

The coupling device also allows the evaluation arrangement to request all the input data for a load forecast, for example, from the coupling device without having to produce specific requests for all the connected energy engineering devices.

The first and second communication links may be any popular communication link, e.g. Ethernet or the like. They may be cable-based (e.g. using copper cables or optical fibers) or radio links.

For the first communication link, a connection via the Internet is preferably used, because the latter is widespread and can be used at low cost.

The second communication link may be specific to every single connected energy engineering device or the same for all the energy engineering devices.

An essential advantage of the method according to the invention in this case is that different energy engineering data from different energy engineering devices are combined by the coupling device, e.g. on the customer's premises, and provided for evaluation in a standard data format, with even a change in the evaluation in the evaluation arrangement requiring no adjustment to be performed at the customer end, because the coupling device always communicates with the corresponding evaluation arrangement using the standard data format.

It is a further advantage of the method according to the invention that energy engineering data that are needed by a provider of evaluation methods, for example for the evaluation in the evaluation arrangement, and are distributed in various products and systems for energy automation, for example with a customer in an energy supply company, can be requested centrally using the coupling device. The little-feasible need to set up a dedicated connection between every single component and a web-based application service, for example, is dispensed with.

In one preferred embodiment of the method according to the invention, the energy engineering devices used are at least one of the following energy engineering devices: field devices, station control technology, grid control technology, electricity meter data management, electricity meter, energy management.

In another preferred embodiment of the method according to the invention, the data request contains details pertaining to the definition and/or parameterization of the energy engineering devices. In this case, a definition is the description of a function of portions or of the whole energy engineering device in question; parameterization contains details concerning how this function needs to be used. This is an advantage because it allows a user, for example, to alter the settings for an energy engineering device directly, for example in order to facilitate an evaluation. In another example, the result of an evaluation that is automatically identified may be that parameterization of an energy engineering device needs to be improved.

In a further preferred embodiment of the method according to the invention, the data request in the coupling data format is produced by evaluation devices that can be added, removed or altered in the course of operation of the evaluation arrangement. An evaluation device may be embodied as a specific appliance or be implemented as a data processing method on a computer or a cloud-based data processing arrangement, such as a company cloud. This embodiment is advantageous because the modular design allows a wide variety of evaluations to be carried out independently of one another. In this case, for each evaluation device, a description of the data is stored that it needs to obtain from the downstream energy automation, such as the connected energy engineering devices, and that it needs to pass thereto. This concept allows functions and applications that are today already available in the products and systems of the energy engineering automation to be relocated to the evaluation arrangement. In this case, the evaluation arrangement may be in the form of an application server that can be operated in modular fashion, for example. This advantageously allows a reduction in cost for products and systems of the energy engineering automation (CAPEX and OPEX) and hence the attainment of competitive advantages for a customer. A further advantage is that changes in the evaluation devices can be made available to all the users/customers at the same time.

In a further preferred embodiment of the method according to the invention, the evaluation devices used are an evaluation device for a load forecast and/or an evaluation device for a grid stability computation.

In principle, it is possible to use any type of evaluation device that is used in energy management systems or grid control systems.

In a further preferred embodiment of the method according to the invention, the evaluation devices are used to evaluate the data response and present it in a display device.

In a further preferred embodiment of the method according to the invention, the first communication link is encrypted. This is an advantage because the communication between the coupling device and the evaluation arrangement (e.g. an application server) can take place over secured connections that meet e.g. the relevant requirements of energy supply companies (e.g. BDEW white paper, NERC/FERC guidelines). In particular, it is advantageous that the encryption of this one connection allows the safe transmission of all the energy engineering data that are available e.g. with a customer.

In a further preferred embodiment of the method according to the invention, the data response is stored only in the coupling device. This is an advantage because security-relevant energy engineering data do not need to be stored outside the infrastructure e.g. of a customer in the case of the method according to the invention. Therefore, there is no longer the risk of huge damage to the national economy occurring in the event of hacker attacks on a central server that contains the evaluation arrangement and the data of numerous customers.

In one development of this embodiment, the coupling device is configured such that it stores the data response automatically. This is an advantage because in this way data, once retrieved from the energy engineering devices, are stored centrally and can quickly be recalled later when needed.

In another development of this embodiment, the coupling device is configured such that it denotes the data response using a stipulation from a user. This denotation stipulates whether the data response is stored in the coupling device and/or in the evaluation arrangement.

In a further preferred embodiment of the method according to the invention, the data request has details pertaining to at least one energy-engineering-device-specific update cycle time, as a result of which the coupling device is used to update the data response in accordance with the energy-engineering-device-specific update cycle time by repeatedly transmitting the respective specific data requests and to transmit it to the evaluation device. This is an advantage because it allows energy engineering data to be kept constantly up to date for the evaluation, insofar as this is necessary for the evaluation.

In a further preferred embodiment of the method according to the invention, the data response is constantly updated in accordance with the energy-engineering-device-specific update cycle time for as long as a user uses the evaluation device, the update being interrupted when the user terminates use. This is an advantage because in this way computation capacity and data transmission bandwidth are used only when a user is also actually interested in an evaluation.

In a further preferred embodiment of the method according to the invention, the data response is compressed prior to the transmission. This is an advantage because the data response can be transmitted more quickly in this way, particularly when there is only a limited bandwidth available.

In a further preferred embodiment of the method according to the invention, the evaluation arrangement is used to produce a maintenance recommendation and/or a replacement recommendation for an energy engineering device when the data response reveals an error in the relevant power engineering device. This is an advantage because in this way it is possible to avoid failures in energy engineering devices, which saves time and cost.

In addition, the invention has the object of providing the use of the method according to the invention for evaluating energy engineering data, which allows the evaluation of the energy engineering data to be altered by an evaluation arrangement in the course of operation of the method in a manner that is particularly simple and safe for different customers.

In this case, the advantage is attained that customer-specific data are accessible only to the respective customer, which ensures data protection.

In a development of the use of the method according to the invention, user-specific user rights are allocated for all the users associated with a customer. This has the advantage that the users see only energy engineering data and evaluations that are based on their energy automation and that are actually needed in their specific role with a customer.

In addition, the invention has the object of providing an arrangement for evaluating energy engineering data that allows the evaluation of the energy engineering data to be altered in a particularly simple manner by an evaluation arrangement in the course of operation of the method.

In this case, the same advantages arise mutatis mutandis as outlined at the outset for the method according to the invention.

In addition, the invention has the object of providing a computer program product for evaluating energy engineering data that allows the evaluation of the energy engineering data to be altered in a particularly simple manner by an evaluation arrangement in the course of operation of the method when the computer program product is used on a computer or a cloud-based data processing arrangement.

In this case, the same advantages arise mutatis mutandis as outlined at the outset for the method according to the invention.

Other features which are considered as characteristic for the invention are set forth in the appended claims.

Although the invention is illustrated and described herein as embodied in a method, a configuration, use of the method and a computer program product for evaluating energy engineering data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration of all the components that are present for a provider of evaluation solutions according to the invention.

DETAILED DESCRIPTION OF THE INVENTION

Referring now to the single FIGURE of the drawing in detail thereof, there is shown in an upper area of the FIGURE all the components that are present for a provider of evaluation solutions, for example. The upper area is therefore a provider area 50. The provider area 50 contains an evaluation arrangement 2 having evaluation devices 41-44.

All the components that are used for communication are shown in a central area. The central area 52 is therefore a communication area 52 and shows first communication links 4, which are transmitted via the Internet 51. The first communication links 4 have end-to-end encryption in this case.

All the components that are in place with a customer of the provider of evaluation solutions are shown in a lower area. The lower area is therefore a customer area 53. The customer area 53 contains a coupling device 5 to which energy engineering devices 11-15 are connected by second communication links 21, which are in the form of cable connections for Ethernet, for example. In addition, the customer area 53 contains a display device 30 by which a user at the customer end can use the evaluation arrangement 2.

The manner in which the method according to the invention works will be explained below.

A user uses the display device 30, for example, to initiate activation of the two evaluation devices 41 and 42; in this case, the evaluation device 41 is a load forecast device and the evaluation device 42 is a grid stability computation device. The two evaluation devices 41, 42 require energy engineering data for their evaluation and therefore contribute to producing a data request 3 within the evaluation arrangement 2.

The data request 3 contains queries pertaining to the required energy engineering data. The data request 3 is produced in a coupling data format and its data format is therefore independent of the data format that is used in the respective evaluation device 41 or 42. The data request 3 is transmitted to the coupling device 5 via the Internet 51 in encrypted form by the first communication link 4.

Within the coupling device 5, the data request 3 is converted into at least one data request 6-10, that is specific to an energy engineering device 11-15 in a device-specific data format. This means that the specific data requests 6-10 are now available specifically in the respective data format of the energy engineering device 11-15 that is to be interrogated, and can be transmitted to the energy engineering device directly by the second communication link 21.

Within the energy engineering devices 11-15, the specific data requests 6-10 are each used to provide the requested energy engineering data 16-20. The energy engineering data 16-20 are transmitted back to the coupling device 5 via the second communication link 21.

Within the coupling device 5, the energy engineering data 16-20 that are available in the respective data format of the energy engineering devices 11-15 are combined in a single data response 22 in the coupling data format. The data response 22 is then transmitted back to the evaluation arrangement 2 via the Internet 51 by the first communication link 4.

In the evaluation arrangement 2, the data response 22 is conditioned such that the requested energy engineering data are provided therefrom for the evaluation device 41 and for the evaluation device 42 in the respective data format required by the evaluation device 41, 42.

It is an essential advantage of the presented method according to the invention that once the coupling device 5 has been set up in the customer area 53 no further alterations need to be made in the customer area 53, even if the evaluation arrangement 2 in the provider area 50 is altered such that altered or other evaluation devices 41-44 are used; this is true even if totally different data formats than previously are required for these altered or new evaluation devices 41-44.

In this way, constant improvement and adjustment of the evaluation arrangement can take place at the provider end without adjustments being necessary at the customer end. This is advantageous particularly with regard to security aspects and modernization of evaluation devices 41, 42.

The invention claimed is:

1. A method for evaluating power engineering data, which comprises the steps of:
    providing a cloud-based data processing configuration for producing a data request having a coupling data format, producing the data request having the coupling data format by means of evaluation devices that can be added, removed or altered in a course of operation of the cloud-based data processing configuration;
    transmitting the data request to a coupling device via a first communication link;
    converting, via the coupling device, the data request in the coupling data format into at least one further data request in a device-specific data format that is specific to an energy engineering device, the energy engineering device being selected from the group consisting field devices, station controllers, grid controllers, electricity meter data management controllers, electricity meters, and energy management controllers;
    transmitting the at least one further data request to the energy engineering device via a second communication link;
    transmitting, via the energy engineering device, power engineering data of the energy engineering device, requested by the further data request, to the coupling device via the second communication link, wherein the energy engineering data are in a data format that is specific to the energy engineering device; and
    converting, via the coupling device, all the power engineering data requested by means of further data requests into a data response having the coupling data format and transmitting the data response to the cloud-based data processing configuration via the first communication link.

2. The method according to claim 1, wherein the evaluation devices provided include an evaluation device for a load forecast and an evaluation device for a grid stability computation.

3. The method according to claim 1, which further comprises using the evaluation devices to evaluate the data response and present the data response in a display device.

4. The method according to claim 1, wherein the first communication link is encrypted.

5. The method according to claim 1, which further comprises storing the data response only in the coupling device.

6. The method according to claim 1, wherein the data request has details pertaining to at least one energy-engineering-device-specific update cycle time, as a result of which the coupling device is used to update the data response in accordance with the energy-engineering-device-specific update cycle time by repeatedly transmitting the further data requests and to transmit the data response to the cloud-based data processing configuration.

7. The method according to claim 6, which further comprises constantly updating the data response in accordance with the energy-engineering-device-specific update cycle time for as long as a user uses the cloud-based data processing configuration, the update being interrupted when the user terminates use.

8. The method according to claim 1, wherein the cloud-based data processing configuration is used to produce at least one of a maintenance recommendation or a replacement recommendation for an energy engineering device when the data response reveals an error in the energy engineering device.

9. The method according to claim 1, wherein:
    the cloud-based data processing configuration is used to evaluate the power engineering data for a plurality of different customers, each having customer-specific coupling devices and energy engineering devices, in each case on a customer-specific basis, such that all the customer-specific data requests and the data responses are each processed separately from one another in order to ensure data protection.

10. A system for evaluating power engineering data, comprising:
    a cloud-based data processing configuration for producing a data request in a coupling data format, said cloud-based data processing configuration having at least one evaluation device used in said cloud-based data processing configuration to produce the data request in the coupling data format, said at least one evaluation device can be added, removed or altered in a course of operation of said cloud-based data processing configuration;
a first communication link for transmitting the data request and a data response;
at least one energy engineering device, the energy engineering device being selected from the group consisting field devices, station controllers, grid controllers, electricity meter data management controllers, electricity meters, and energy management controllers;
a coupling device suited to converting the data request from the coupling data format into at least one further data request that is specific to said energy engineering device in a device-specific data format, and is further suited for converting all the power engineering data requested by means of further data requests into the data response having the coupling data format;
at least one second communication link for transmitting the further data request for requesting the power engineering data; and
said at least one energy engineering device suited for transmitting the power engineering data requested by the further data request to said coupling device by means of said second communication link, wherein the power engineering data are in a data format that is specific to said energy engineering device; and
said coupling device suited for converting the power engineering data requested by the data response to the cloud-based data processing configuration via the first communication link.

11. The system according to claim 10, wherein said coupling device is exclusively suited to storing the data response by means of a data memory.

12. The system according to claim 10, wherein: said cloud-based data processing configuration is suited to providing the data request with details pertaining to at least one energy-engineering-device-specific update cycle time; and
said coupling device is suited to updating the data response in accordance with the energy-engineering-device-specific update cycle time that the data request contains by repeatedly transmitting the further data requests to said at least one energy engineering device and to transmitting an updated data response to said cloud-based data processing configuration.

13. A non-transitory computer-readable medium having a computer-readable program when executed by a processor performs a method for evaluating power engineering data, which comprises the steps of:
providing, via a cloud-based data processing configuration, a data request having a coupling data format, the data request having the coupling data format being produced by means of evaluation devices that can be added, removed or altered in a course of operation of the cloud-based data processing configuration;
transmitting the data request to a coupling device via a first communication link;
converting, via the coupling device, the data request from the coupling data format into at least one further data request in a device-specific data format that is specific to an energy engineering device, the energy engineering device being selected from the group consisting field devices, station controllers, grid controllers, electricity meter data management controllers, electricity meters, and energy management controllers;
transmitting the at least one further data request to the energy engineering device via a second communication link;
transmitting, via the energy engineering device, power engineering data of the energy engineering device, requested by the further data request, to the coupling device via the second communication link, wherein the power engineering data are in a data format that is specific to the energy engineering device; and
converting, via the coupling device, all the power engineering data requested by means of further data requests into a data response having the coupling data format and transmitting the data response to the cloud-based data processing configuration via the first communication link.

* * * * *